US005727424A

United States Patent [19]

Brandewie et al.

[11] Patent Number: 5,727,424
[45] Date of Patent: Mar. 17, 1998

[54] COUNTERWEIGHT FOR TRUCK TRANSMISSION SHIFT LEVER

[75] Inventors: Kenneth R. Brandewie, Ossian; Floyd E. Fegley, Fort Wayne, both of Ind.

[73] Assignee: Navistar International Transportation Corp., Chicago, Ill.

[21] Appl. No.: 707,841

[22] Filed: Sep. 9, 1996

[51] Int. Cl.$^6$ .................................... F16H 59/04
[52] U.S. Cl. .................. 74/473 R; 180/336; 403/344
[58] Field of Search ................ 74/473 R; 180/336; 403/373, 344

[56] References Cited

U.S. PATENT DOCUMENTS

| 2,561,632 | 7/1951 | Nejezchleb | 74/473 R |
|---|---|---|---|
| 3,693,467 | 9/1972 | Oehl | 74/473 R |
| 3,990,535 | 11/1976 | Bruce | 74/473 P X |
| 4,507,980 | 4/1985 | Nishiyama et al. | 74/473 R |

*Primary Examiner*—Allan D. Herrmann
*Attorney, Agent, or Firm*—Dennis K. Sullivan

[57] ABSTRACT

A counterweight is proposed for engagement to a lower end of a truck transmission shift lever in a manner to extend forwardly therefrom, relative to the vehicle. The counterweight maintains a center of gravity of the shift lever vertically aligned over a pivot point of the shift lever regardless of the rearward degree of pivoting of the lever from a neutral, vertically oriented equilibrium position thereof. Such maintained vertical alignment of the lever center of gravity relative to the pivot point significantly decreases the tendency of the lever to return to vertical orientation, such return causing a disengagement of the transmission gears, particularly in high gear and during periods when power is not being transferred through the transmission while the truck is traveling over uneven terrain.

11 Claims, 3 Drawing Sheets

COUNTERWEIGHT FOR TRUCK TRANSMISSION SHIFT LEVER

BACKGROUND OF THE INVENTION

The present invention relates to a counterweight which is proposed for use on a truck transmission shift lever to minimize, if not altogether eliminate, transmission gear jump out.

THE PRIOR ART

A field problem of truck transmissions jumping out of gear (primarily from a high gear into neutral) exists. The cause of such occurrence has been identified as a specific situation where the transmission, engaged in high gear, is not transferring power therethrough and the truck encounters an uneven surface which jars the transmission. When the transmission is in high gear, the gear shift lever is at a rearward most pivoted position thereof relative to the pivot point for the lever. The center of gravity of the lever is located along the length of the lever and a balance or equilibrium position for the lever is produced when the lever is vertically oriented over the pivot point. The rearwardly pivoted position of the lever when the transmission is engaged in high gear, moves the center of gravity of the lever rearwardly, the balance is destroyed by the moment of the pivoted position of the lever. Thus, when the transmission is not transferring power therethrough and is jarred at the same time, the moment of the lever comes into play causing the lever 10 to return to its equilibrium position by jumping forwardly and causing gears of the transmission to jump out, or disengage.

Present day solutions for eliminating the jump out problem require removal of the transmission from the vehicle for adjustments to be made, a very costly and time consuming procedure.

SUMMARY OF THE INVENTION

Accordingly it is a primary object of the invention to provide an inexpensive and simple solution to the gear jump out problem.

The primary object, as well as others, is met by the counterweight of the present invention which is defined as a structure of predefined mass attached to a base portion of the shift lever, with a major portion of the mass extending perpendicularly forwardly of the shift lever, creating a forward shift of the center of gravity to a position over the pivot point of the lever by countering the rearward moment caused by the rearward pivoting of the lever. The counterweight is easily attached from inside the cab by simply elevating the shift lever boot to allow access to the lever base.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
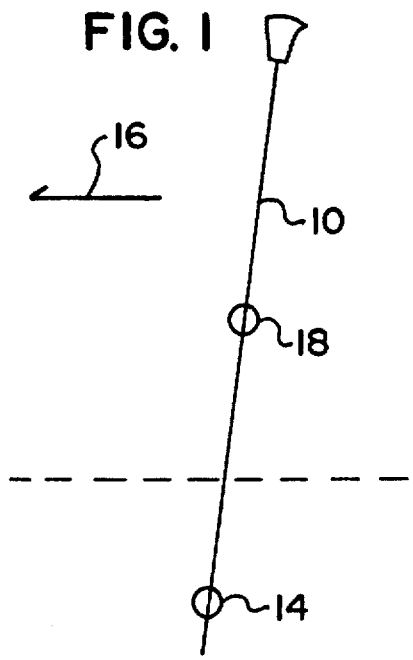
FIG. 1 is a schematic representation of a shift lever which is rearwardly pivoted and showing the center of gravity of the lever out of vertical alignment with the pivot point of the lever.

Referring now to the drawings in greater detail there is illustrated in FIG. 1 a schematic representation of a transmission shift lever 10 having a pivot point 14 about which the lever 10 pivots in a fore/aft arc. The lever 10 is shown as it would typically be rearwardly pivoted when higher gears of the truck transmission are engaged, with arrow 16 indicating a forward direction for a vehicle (not shown) incorporating the lever 10. The lever 10 has a center of gravity 18 which lies along the height (length) of the lever 10 indicated as a point 18. When the lever 10 is vertically oriented, the point 18 is aligned above the pivot point 14, defining an equilibrium position for the lever 10. When the lever 10 is pivoted away from a vertical orientation, the equilibrium is destroyed. Inasmuch as an equilibrium position requires no force to maintain, the lever 10 tends to return to such balanced, equilibrium position from pivoted positions thereof when the transmission is not transferring power and as the truck is traveling over an uneven surface, causing gear disengagement, referred to as jump out.

One mode of accommodating the equilibrium requirement, eliminating transmission gear jump out, is to cause the center of gravity 18 of the lever 10 to remain in vertical alignment over the pivot point 14, regardless of the moment of the pivoted lever 10.

Figure 2:
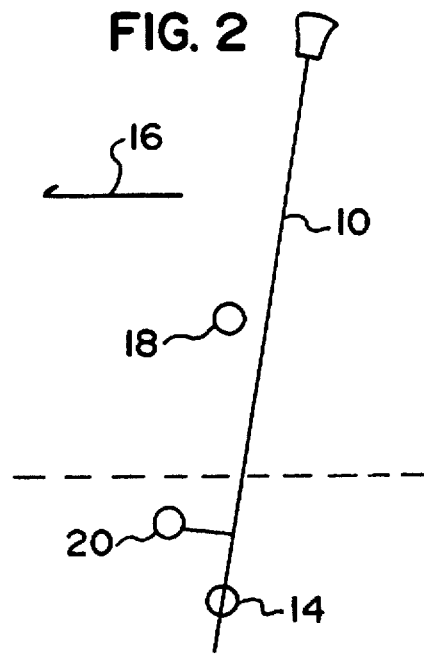
FIG. 2 is a schematic representation similar to that of FIG. 1, with the counterweight of the present invention being mounted to the lever in accordance with the teachings herein, and showing the center of gravity of the pivoted lever now shifted into vertical alignment over the pivot point.

As shown in FIG. 2, it was found through empirical testing that shifting of the lever center of gravity 18 into alignment over the pivot point 14 could be produced by applying a forwardly directed counter force or moment against the rearward moment created by the rearward shift of the lever 10, such counter moment balancing the rearward moment, shifting the center of gravity 18 back over the pivot point 14.

Such counter force may be provided by a counterweight 20 made in accordance with the teachings of the present invention.

Turning now to FIGS. 3–8 there is disclosed therein a preferred embodiment of the counterweight 20.

Figure 3:
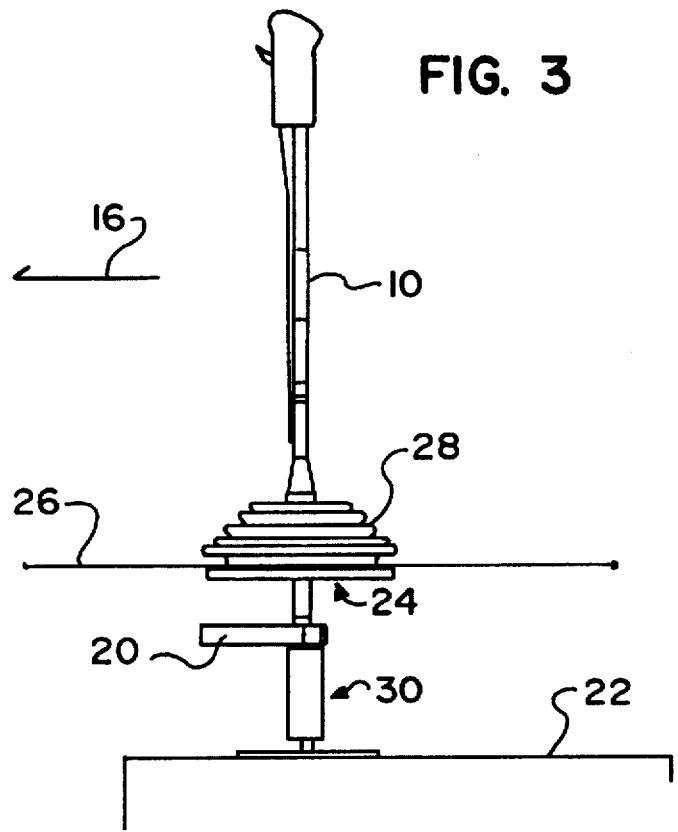
FIG. 3 is a perspective view of the preferred counterweight structure showing same mounted to a base portion of a transmission lever below a cab floor and spaced above a housing of the transmission, with a major portion of the mass of the counterweight structure extending forwardly of the lever.
Figure 4:
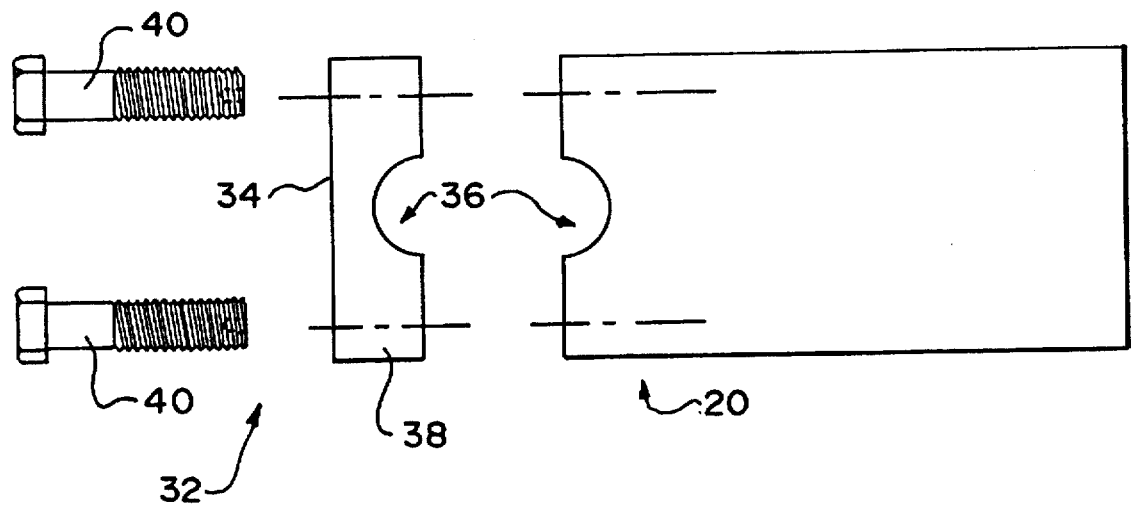
FIG. 4 is a top plan view of the preferred counterweight structure in a disassembled state thereof.
Figure 5:
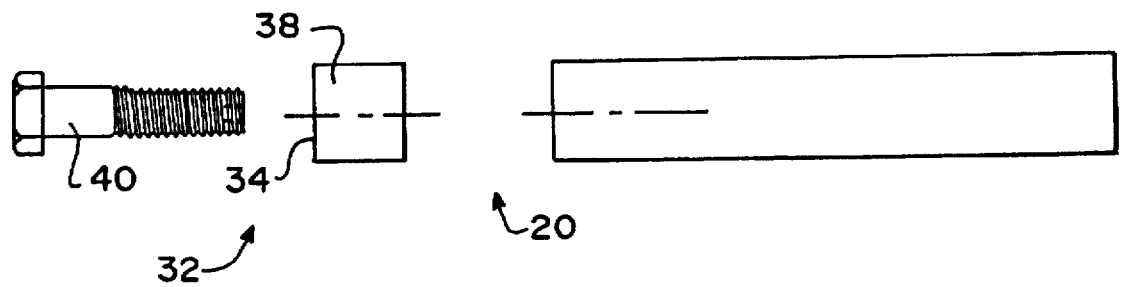
FIG. 5 is a side view of the disassembled structure.
Figure 6:
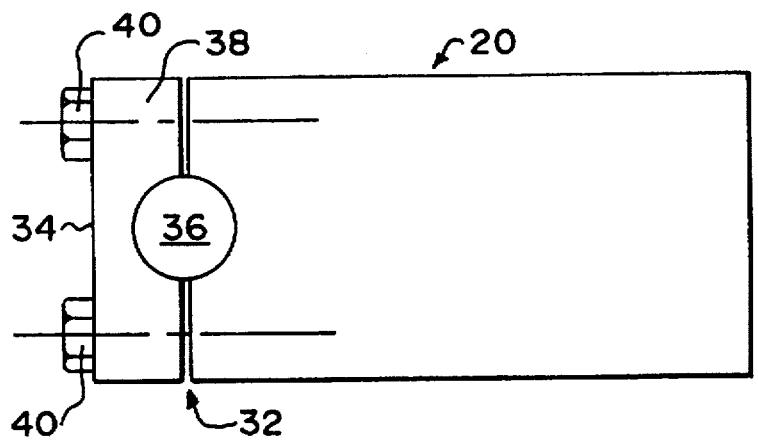
FIG. 6 is a top plan view of the preferred counterweight structure in an assembled state thereof.
Figure 8:
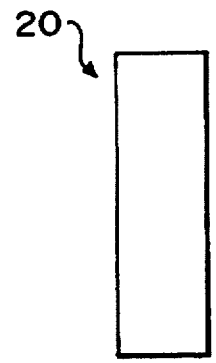
FIG. 8 is an end view of the structure.
Figure 7:
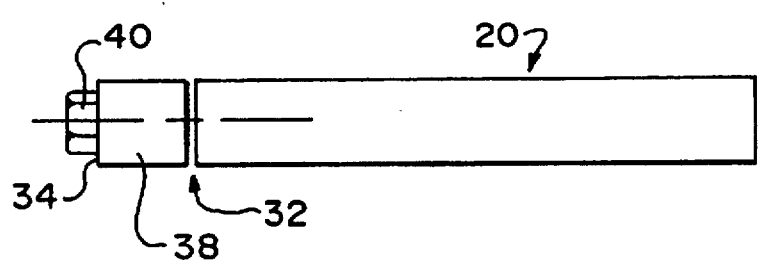
FIG. 7 is a side view of the assembled structure.

In FIG. 3, the shift lever 10 is shown to extend upwardly from a transmission housing 22 within which the pivot point 14 (not shown) is located.

The lever 10 extends into a cab area (not shown) through an opening 24 in a floor 26 of the cab. The opening 24 is covered by a shift lever boot 28 which can be easily slid up the lever 10 to allow access to a base portion 30 of the lever 10. The counterweight 20 is engaged to this lever base portion 30, from inside the cab, by reaching through the opening 24.

It will be appreciated that engagement of the counterweight 20 to the lever base portion 30 should be an uncomplicated process due to limited accessibility available through the opening 24.

To this end, the configuration for the counterweight 20 shown in FIGS. 4-8 is preferred.

As shown, the counterweight 20 is a thin, narrow, rectangular structure 20 of predetermined mass. The required mass is application specific and relates to physical parameters of the lever 10 and the transmission. The counterweight 20 incorporates a lever engaging mechanism 32 within one narrow end 34 thereof which provides for simple attachment of the counterweight 20 to the lever base portion 30.

End attachment of the counterweight 20, substantially as shown in FIG. 3, with a majority of the mass thereof extending forwardly of the lever 10, counters the rearward displacement of the center of gravity 18, as shown in FIG. 2, dramatically decreasing, if not altogether eliminating, the occurrence of transmission jump out.

The proposed embodiment for the lever engaging mechanism 32 is illustrated as comprising a port 36 created in the end 34 which is sized to frictionally engage about the lever 10, to maintain desired forward extension from the lever 10.

The port 36 may be defined by splitting off a slice 38 of the end 34 of the counterweight 20 as shown, creating an end yoke 38 which releasably attaches to the remainder of the counterweight structure 20, the port 36 being centeredly defined therebetween. The yoke 38 is engaged to the remainder of the structure 20 once the base portion 30 of the lever 10 is positioned within the port 36, the yoke 38 engagement being provided by any suitable means, such as by bolting of the yoke 38 to the structure 20 with two end bolts 40, as shown.

It will be understood that, for example, the end yoke 38 could be hingedly fixed to the counterweight 20 at one end thereof and incorporate a clasp assembly for engagement at the opposite end. Further, the yoke 38 could be eliminated, and a double ended clamp could be used. Thus, any lever engaging mechanism 32 which would maintain fixed forward extension of the counterweight 20 could be utilized.

Also, the counterweight 20 could be adjustable with regard to distance from the lever 10 and therefore the forward force or moment produced by the counterweight 20 would be adjustable, as well. Such adjustability could be provided by telescopic mounting of the counterweight 20. In this respect, physical laws substantiate that the greater the distance between the lever 10 and the counterweight 20, the greater the force or moment produced by the counterweight 20.

Thus, the preferred embodiment disclosed should not be construed as limiting.

As described above, the counterweight 20 provides a number of advantages, some of which have been described above and others of which are inherent in the invention.

Also, modifications can be proposed to the counterweight 20 without departing from the teachings herein. Accordingly, the scope of the invention is only to be limited as necessitated by the accompanying claims.

What is claimed is:

1. A counterweight engaged to a rearwardly pivotable gear shift lever of a truck transmission for maintained equilibrium, regardless of pivoted lever position, the shift lever having a predetermined length, having a pivot point at a lower end thereof, and having a center of gravity along the length thereof which defines lever equilibrium when the lever is vertically oriented over the pivot point, the lever pivoting rearwardly of vertical producing a specific moment when gear engagement is desired, the counterweight comprising an elongate structure of predefined mass which engages the lever at a location above the pivot point and extends perpendicularly forward of and a predetermined distance outwardly from the lever compromising the rearward moment of the pivoted lever, shifting the lever center of gravity forwardly into vertical alignment over the pivot point.

2. The counterweight of claim 1 comprising a thin, narrow, elongate structure of a predefined mass.

3. The counterweight of claim 2 having a first narrow end incorporating a shift lever engaging structure thereon.

4. The counterweight of claim 3 wherein the lever engaging structure frictionally engages the lever for maintained forwardly extending orientation for the mass of the counterweight relative to the lever.

5. The counterweight of claim 4 wherein the lever engaging structure maintains the counterweight substantially perpendicular to the lever.

6. The counterweight of claim 5 wherein the lever engaging structure is an opening within which the lever is releasably engaged.

7. The counterweight of claim 6 wherein the opening is defined between a releasable end yoke and a remainder of the counterweight.

8. The counterweight of claim 7 wherein said end yoke is releasably engaged to the remainder of the counterweight by threaded connectors.

9. A counterweight which is engaged to a rearwardly pivotable transmission shift lever, the counterweight being a structure of predefined mass which is oriented to extend perpendicularly forwardly from the lever.

10. The counterweight of claim 9 including lever engaging structure which frictionally maintains desired orientation of the counterweight.

11. The counterweight of claim 10 being engaged to a bottom portion of the lever.

* * * * *